United States Patent
Bucaram et al.

[15] 3,640,824
[45] Feb. 8, 1972

[54] PARAFFIN INHIBITOR IN CRUDE OIL WITH HIGH-MOLECULAR WEIGHT HIGHLY BRANCHED POLYETHYLENE

[72] Inventors: Salim M. Bucaram; Lawrence V. Collings, both of Tulsa, Okla.
[73] Assignee: Sinclair Oil & Gas Company, Tulsa, Okla.
[22] Filed: Nov. 19, 1965
[21] Appl. No.: 508,834

[52] U.S. Cl. .................................252/8.3, 166/304, 252/8.55 B
[51] Int. Cl. ........................................E21b 43/00, C09k 3/00
[58] Field of Search ..................252/8.3, 8.55 B, 59; 166/41; 44/62

[56] References Cited

UNITED STATES PATENTS

| | | | |
|---|---|---|---|
| 2,364,222 | 12/1944 | Kaufman | 252/8.55 |
| 2,204,967 | 6/1940 | Moser | 252/8.3 X |
| 2,379,728 | 7/1945 | Lieber | 44/62 X |
| 2,852,445 | 9/1958 | Howard et al. | 252/59 X |
| 3,051,653 | 8/1962 | Skolaut et al. | 252/8.3 |
| 3,276,519 | 10/1966 | Knox et al. | 166/41 |

FOREIGN PATENTS OR APPLICATIONS

| | | | |
|---|---|---|---|
| 993,744 | 6/1965 | Great Britain | 44/62 |
| 1,320,943 | 2/1963 | France | |

OTHER PUBLICATIONS

Reistle et al — Paraffins and Congealing Properties — bulletin 348 — Published 1932 by U.S. Dept. of Commerce, Bureau of Mines — pages 10 and 11.
Polyethylene Blow Molding, Pub. by U.S.I. Chemicals, first edition, pages 1, 3 to 6, 9, and 10.
Microthene Polyolefin Powder — general information — Pub. 1965 — U.S.I. chemicals — second edition — all pages.

*Primary Examiner*—Herbert B. Guynn
*Attorney*—Morton, Bernard, Brown, Roberts & Sutherland

[57] ABSTRACT

A paraffin inhibitor for use in treating crude oil which contains as the essential ingredient in an amount effective to inhibit paraffin deposition, polyethylene having a molecular weight in excess of about 6,000 and a structure having at least 10 percent branching. The inhibitor may additionally contain naphthalene, microcrystalline wax having a melting point in excess of about 160° F. and/or asphaltenes.

8 Claims, No Drawings

PARAFFIN INHIBITOR IN CRUDE OIL WITH HIGH-MOLECULAR WEIGHT HIGHLY BRANCHED POLYETHYLENE

This invention relates to an inhibitor composition for reducing paraffin deposition from crude oil.

During the production of many crude oils, recovery is impeded by the accumulation of paraffin deposits which tend to clog the production equipment including screens, pumps, etc., and also the pores of the reservoir rock through which the oil flows. A continuous effort is required to remove the deposits and maintain satisfactory production rates. A number of remedial measures have been employed in the past for removing these deposits such as the use of scrapers, solvents, and heat. Most technical articles on paraffin deposition are concerned with these remedial techniques. Prevention, rather than removal, of deposits appears, however, to offer the best possibility for an economical solution to the paraffin problem. Accordingly, chemical inhibitors to affect the wetability of metal surfaces through film-forming action or chemical inhibitors which modify and disperse the wax crystals have been the subject of investigation.

Chemical inhibitors include naphthalene, anthracene, and others. Polyethylene has also been generally suggested as a paraffin inhibitor, see Venezuelan Pat. inscription No. 176–63. However, these chemical inhibitors have not been universally successful and, in fact, these inhibitors are ineffective with certain crude oils. Although heretofore the effectiveness of known chemical inhibitors, e.g., polyethylene, has been a hit-or-miss proposition, it has now been discovered that polyethylene of a particular structure, i.e., highly branched, is generally effective to inhibit the deposition of paraffin waxes in crude oils because of its ability to modify and/or reduce the size of paraffin crystals precipitated from crude oil.

Polyethylene is manufactured by polymerizing ethylene. Polyethylenes, example, are available in a wide range of molecular weights, e.g., from less than about 1,500 to 2,000,000, and with linear or branched structures, e.g., up to about 50 percent branched. A branched polyethylene structure is one in which the carbon atoms in the polymer chain contain either alkyl branches or branched vinyl structures, or both. The percent branching refers to the weight percent of branched carbon atoms in the polymer chain, e.g., per 1,000 carbons, and is determined by infrared spectra. Linear polyethylene has little effect on paraffin precipitation from oil. Branched polyethylene, i.e., at least 10 percent branched, on the other hand, induces a reduction in the size of precipitated paraffin crystals and prevents agglomeration of the articles. Furthermore, branched polyethylene of molecular weight below about 6,000 has little appreciable effect on the crude oil.

The inhibitor of this invention, therefore, comprises polyethylene having a structure at least 10 percent branched, preferably at least 25 percent branched, and having a molecular weight in excess of about 6,000, preferably above 20,000, as determined by the viscosity method. The polyethylenes are petroleum crude oil soluble in concentrations exceeding 100 p.p.m. and are effective as inhibitors in concentrations in the crude oil from about 0.1 p.p.m. and up, preferably at least 10 p.p.m., with the top limit being determined for economic reasons. In treating an oil well these amounts are based on the amount of oil produced from the well.

A highly effective group of polyethylenes are, for example, U.S. Industrial Chemical Company's Microthene series having an average molecular weight of the order of 20,000 and 40–50 percent branching. The branched high molecular weight polyethylenes are effective in reducing paraffin crystal size in crude oils regardless of the type, i.e., paraffinic or asphaltic, of oil treated. To be effective, polyethylene must be in solution in the oil before paraffin precipitation occurs. Powdered polyethylene can be used by either dissolving or suspending it in a hydrocarbon liquid. The powdered polyethylene can also be injected into the casing annulus of an oil well followed by a slug of fluid. Polyethylene of small particle size, e.g., to about 0.25 inch in its largest dimension, advantageously to passing through a screen of 12 mesh or finer, e.g., 16 mesh, is preferred. The polyethylene should not be melted since the particles would disappear as melt and come out a plastic mass.

Paraffin deposits removed from field equipment range from almost pure white paraffin wax to those which are almost totally asphaltic in nature. Most deposits fall between these extremes and contain paraffin waxes, microcrystalline waxes, asphaltic material, oil, water, resins, sand, and silt. Paraffin waxes often constitute about 40 to 60 percent of a crude paraffin deposit and can be described as long-chain hydrocarbon compounds containing from about 26 to about 50 carbon atoms. Their molecular weights are usually less than 600 and their melting points are below 160° F. Solid paraffin waxes consist of large, well-formed crystals which agglomerate, forming event larger units. These crystals have the appearance of plates or large needles, the latter being preponderant for the higher molecular weights. Microcrystalline waxes, long-chain hydrocarbon compounds with branched chain and cyclic-ring molecules located frequently at random along the carbon chain, account for less than 10 percent of the crude paraffin deposits. Their molecular weights are above 600 and their melting points range from 160° to about 200° F. The crystalline structure of microcrystalline waxes is small and irregular and the crystals tend to remain dispersed in fluid media and show little tendency to agglomerate. Asphaltic materials, i.e., asphaltenes, are also found in crude paraffin deposits. These materials are extremely sticky, dark, semisolid amorphous substances and are made up of condensed aromatic rings with few side chains and have carbon-hydrogen ratios of approximately 10 to 1. Molecular weights range from less than 1,000 to above 100,000. The amount of asphaltenes present in crude oils has been reported as ranging from about 10 to 56 percent. In view of the different materials in the deposits, a combination of inhibitors is preferred for maximum effectiveness.

Since the materials found in paraffin deposits can be classified by melting point range, the entire range of waxy materials in paraffin deposits can be defined by selecting four relatively wide boiling point refinery fractions, each of which contains all of the waxy materials within a certain group. The fractions are: (1) Light Lube Distillate (LLD) fraction (100 vis at 100° F. Paraffin Distillate) containing paraffin waxes having melting points between 130° and 145° F.; (2) Medium Lube Distillate (MLD) fraction (120 vis at 100° F. Paraffin Distillate) containing paraffin waxes having melting points between 130° and 145° F.; (3) Heavy Lube Distillate (HLD) fraction (70 vis at 100° F. Paraffin Distillate) containing paraffin waxes having melting points between 145° and 170° F.; and, (4) Heavy Reduced Crude (HRC) fraction containing microcrystalline waxes (microwaxes) and asphaltenes. The Light, Medium and Heavy Distillates play the most important role in the deposition process since essentially all paraffin waxes are contained within these fractions. Within these fractions the waxes are similar with regard to crystallization behavior and response to inhibitors. Accordingly, combinations of inhibitors are generally preferred to provide a broad range of protection against paraffin deposition.

With these precepts in mind, an especially effective inhibitor against paraffin deposition in accordance with this invention is a combination of naphthalene and polyethylene, particularly in the form of solid sticks. The naphthalene serves as a paraffin inhibitor in its own right, and as a binder in which polyethylene powder is suspended. Naphthalene can be used as a solid comprising naphthalene and beta naphthol or naphthalene and anthracene, the beta naphthol and anthracene being added to make the naphthalene dissolve slowly. The sticks can be extruded or pressed since generally only about 25 percent polyethylene in suspension in molten naphthalene can be poured with ease. By extruding or pressing, sticks containing up to about 75 percent, or more, polyethylene are possible.

Another paraffin inhibitor in accordance with this invention is a mixture of naphthalene; a microcrystalline wax, e.g., a petroleum microwax; and polyethylene. Suitable microwaxes for use in this invention include microwaxes of the Cercon family (Sinclair Refining Company), Petrolite's C–1035, C–200–A7, C–700m, C–200, C–500, Jet Black, or waxes of melting points above 170° F. extracted either from crude oil or tank bottoms. The petroleum microwaxes include those hydrocarbon waxes which are normally derived from heavy lubricating oil fractions obtained from paraffin and mixed base crude oils and which waxes have a fine, less apparent crystalline structure than paraffin wax. The wax can be in the form of petrolatum wax which generally contains up to 40 percent oil, more often about 5 to 25 percent, or the wax may be in the more refined or deoiled form. In the derivation of the microwaxes the heavy lubricating oil stocks, preferably those stocks nondistillable from petroleum by normal means, i.e., residual stocks, may first be subjected to solvent deasphalting, solvent refining with phenol or other solvents selective for aromatics or hydrotreating, and then to the normal dewaxing and deoiling procedures to produce the wax. Dewaxing may be accomplished by any one of a number of suitable processes including solvent extraction at low temperatures followed by crystallization and separation by centrifugation or by solvent dewaxing with methyl ethylketone solutions. The resulting petrolatum wax may if desired, be further deoiled as by methyl-ethylketone treatment to give a variety of microcrystalline waxes. The wax may also be obtained as foots waxes or foots oils during the manufacture of other microwaxes.

The microwaxes having the desired solubility characteristics for use in the present invention normally have a melting point of at least about 160° F. The preferred microwaxes have a melting point from about 170° to 190° F. A microwax suitable for use in this invention may be obtained by first vacuum distilling a mixed base crude to remove fractions boiling below 1,050° F. The residual stock is deasphaltized by conventional propane extraction. The deasphaltized oil is then dearomatized by phenol treating and dewaxed at −8° F. by solvent dewaxing, employing a 50–50 mixture of MEK-toluene as the solvent. The resultant petrolatum is double-deoiled by conventional MEK-toluene deoiling at 50° F. The resulting microwax has a melting point of about 170° F.

Another preferred inhibitor is a mixture which adds to the naphthalene-polyethylene-microcrystalline wax mixture, asphaltenes or any refinery fraction containing asphaltenes. A heavy reduced crude, for example, provides a source of microcrystalline wax, asphaltenes, or both. Each of these materials changes the structure of paraffin crystals in the crude oil and/or their ability to attach to production equipment and each is soluble in or can be carried in a suspension of the crude oil. The mechanism appears to be a reduction in crystal size and a favorable change in the crystal structure of paraffin precipitated from oil. The crystals show less tendency to agglomerate and adhere to production equipment. Additionally, each of the materials used in the inhibitor combinations of this invention is most effective in changing crystal size of waxes in specific melting point ranges, as shown by microscopic examination of the wax inhibitor mixture, and, accordingly, is most effective in a particular fraction. Naphthalene and microwax are most effective for waxes below 130° F. melting point; heavy reduced crude (containing both microwax and asphaltenes) is most effective for waxes in medium lube distillate having melting points between 130° and 145° F.; and polyethylene is most effective for waxes above 130° F. melting point, i.e., medium and high lube distillates, and particularly for waxes in the high-lube distillate having a melting point above 145° F.

An inhibitor composition of this invention can contain polyethylene in an amount sufficient to provide effective inhibition or polyethylene in combination with naphthalene, microcrystalline waxes and/or asphaltenes with the particular components depending upon types and amount of waxes in the particular crude oil being treated. In general, this amount will vary from about 5 to 90 percent by weight of each material, preferably from about 20 to 80 percent, by weight for a two component mixture, i.e., polyethylene and naphthalene; from about 5 to 90 percent by weight for each component, preferably about 20 to 60 percent, for a three component inhibitor such as polyethylene, naphthalene and microcrystalline wax; and from about 5 to 85 percent by weight, preferably about 15 to 40 percent, for each component in a four component inhibitor. As discussed above, polyethylene is an effective inhibitor in concentrations above about 0.1 p.p.m. based upon the amount of crude oil produced. The components and amounts of each component for a particular inhibitor combination are selected to provide at least about 0.1 p.p.m., preferably at least about 10 p.p.m. of each component in the crude oil treated, e.g., based upon the crude oil produced. Naphthenic crudes or asphaltic crudes, for example, do not require large amounts of, respectively, naphthalene or asphaltenes since the crude oil initially contains these materials, but require larger amounts of polyethylene. For the average crude oil, a typical four-component mixture containing equal parts of each material, i.e., 25 percent of each, provides an effective inhibitor. The amount of inhibitor mixtures used for treating an oil well is in general that which must be added to the oil for effective inhibition. This amount generally ranges from a minimum of about 1 to 50 p.p.m., or less, since polyethylene is effective from about 0.1 p.p.m., and up to about 1, 2 or more percent based upon the crude oil produced. The maximum limit amount used is determined from economic considerations. Amounts from about 10 p.p.m. and up to about 1,000 p.p.m., or 5,000 p.p.m., are preferred.

The inhibitors of this invention are added to the crude oil prior to the paraffin coming out of solution. The inhibitor in solid form can be introduced in the tubing or surface lines at the well or it can be dissolved in oil, i.e., crude oil, and this oil returned to the well via the casing annulus. The solid can also be dissolved in a suitable solvent such as kerosene, Sinclair's No. 18 solvent, toluene, xylene, dimethyl sulfoxide, etc., or combinations of these, resulting in a liquid inhibitor stable down to at least −20° F. As a liquid, the inhibitor can be added to the produced fluids at any point in the flow. A weighting agent such as barium sulfate can be added to the solid, if desired, without affecting its performance.

The following examples further illustrate the invention:

EXAMPLE I

Crystals were precipitated from a solution of a light petroleum distillate containing 20 percent by weight of heavy distillate slack wax. The crystals had a tendency to agglomerate or join together. A similar precipitation was performed with 0.1 percent polyethylene having a molecular weight of 1,500 added to the solution. Photomicrographs were taken of the crystals precipitated. The individual crystals precipitated after polyethylene was added lost their tendency to agglomerate to form large crystals. Thus they are more readily kept in suspension.

EXAMPLE II

About 50 p.p.m. (and higher) microcrystalline wax was added to a Light Lube Distillate petroleum fraction containing paraffin waxes of melting points below 130° F. The addition induced a change in the structure of paraffin wax crystals precipitated from this fraction. This change as observed under the microscope is a change from plates without the inhibitor to needles with the inhibitor added. A similar but less pronounced effect was obtained by the addition of microcrystalline wax to a Medium Lube Distillate petroleum fraction. The needle structure, as observed, has less tendency to agglomerate than the plate structure.

EXAMPLE III

In the process of solvent extraction of crude waxes, an insoluble fraction remains. This fraction consists mainly of asphaltenes. The addition of asphaltenes to a Medium Lube Distillate petroleum fraction containing paraffin waxes of melting points between 130° and 145° F. induced a decrease in the size of paraffin crystals precipitated from that fraction as shown by photomicrographs. A similar but less pronounced effect was observed when asphaltenes were added to a Heavy Lube Distillate petroleum fraction. The smaller size of crystals does not agglomerate as readily as larger crystals.

EXAMPLE IV

In order to investigate polyethylene as a paraffin inhibitor, 19 polyethylenes were tested in the LLD, MLD, and HLD fractions and in crude oils. The procedure followed was to add known amounts of the material (from 0.1 to 1,000 p.p.m.) to the oil which was then heated to approximately 160° F. to dissolve all the paraffin. The sample was then cooled and a slide prepared and studied under a microscope. Photomicrographs were taken. The results observed are presented in table I, together with a description of the properties of the tested polymers. The highly branched structures have about 40–50 percent branching and the branched structures in excess of 10 percent branching.

EXAMPLE VIII

A stick inhibitor containing 25 percent polyethylene, 25 percent microwax, and 50 percent naphthalene; inhibitor chunks combining 40 percent polyethylene and 60 percent naphthalene; and polyethylene powder are each effective in preventing paraffin deposition in oil wells when added at the rate of 1 pound for every 50 to 100 barrels of oil produced.

It is claimed:

1. A crude oil composition containing a paraffin inhibitor having as the essential ingredient therein and in amount effective to inhibit paraffin deposition, polyethylene having a molecular weight in excess of about 6,000, and a structure having at least 10 weight percent of branched carbon atoms in the polymer chain.

2. The crude oil composition of claim 1 which consists essentially of naphthalene and said polyethylene, about 5 to 90 percent by weight of the inhibitor being polyethylene and the polyethylene being present in an amount effective to inhibit paraffin deposition.

3. The crude oil composition of claim 2 which additionally contains from about 5 to 90 percent by weight of a

| Polyethylene | Average, mol. wt. | Type structure | Approximate M.P.-° F. | Specific gravity | Effect on paraffin |
|---|---|---|---|---|---|
| USI polyethylene wax | 2,240 | Highly branched. | 230-266 | .8644 | Highly effective on LLD and MLD. |
| USI polyethylene M-711-952 | | Branched. | 261 | .953 | Slightly effective on LLD, MLD, HLD and crude oil. |
| USI polyethylene M-714 | 20,000 | Highly branched. | 217 | .912 | Highly effective on HLD and crude oil. |
| USI polyethylene M-727 | 20,000 | ...do | 235 | .923 | Highly effective on HLD and crude oil. |
| Union Carbide polyethylene DYLT | 7,000 | Linear | | .910 | None. |
| Union Carbide polyethylene DMPA7335 | | ...do | 250-275 | .953 | Do. |
| Union Carbide polyethylene DKP8035 | 10,000 | ...do | 220 | .924 | Do. |
| Hercules polyethylene Hi-Fax 1901 | $2 \times 10^6$ | ...do | 267 | .945 | Do. |
| Hercules polyethylene Hi-Fax 2001 | 600,000 | ...do | 267 | .962 | Do. |
| Hercules polyethylene Hi-Fax 2401 | 130,000 | ...do | 267 | .962 | Do. |
| Eastman polyethylene-epolene C-10 | 7,000 | Branched. | 220 | .908 | Effective in HLD and crude oil. |
| Eastman polyethylene-epolene C-11 | 10,000 | Linear | 257 | .947 | None. |
| Eastman polyethylene-epolene C-12 | 3,700 | Branched. | 198 | .893 | Effective in HLD and crude oil. |
| Eastman polyethylene-epolene C-13 | 10,000 | Linear | 222 | .912 | None. |
| Eastman polyethylene-epolene N-10 | 2,500 | ...do | 232 | .927 | Do. |
| Eastman polyethylene-epolene N-11 | 1,500 | ...do | 226 | .924 | Do. |
| Eastman polyethylene-epolene N-12 | 1,500 | Branched. | 230 | .937 | Effective on LLD and MLD. |
| Eastman polyethylene-epolene N-13 | | Linear | | | None. |
| Eastman polyethylene-epolene N-14 | | ...do | | | Do. |

EXAMPLE V

Branched, high molecular weight polyethylene has been found effective in reducing the size of paraffin crystals and the agglomeration thereof in the crude oils summarized in table II as shown by photomicrographs of the precipitates produced as in example IV.

microcrystalline wax having a melting point in excess of about 160° F.

4. The crude oil composition of claim 1, wherein said polyethylene has a molecular weight in excess of about 20,000, and a structure having in excess of about 25 weight percent of branched carbon atoms in the polymer chain.

5. A paraffin inhibitor for use in treating crude oil consisting

| Polyethylene | Average mol. wt. | Type structure | Approx. M.P.-° F. | Specific gravity | Crude oil location and asphalt content |
|---|---|---|---|---|---|
| USI—M-727 | 20,000 | Highly branched | 235 | 0.923 | Beaver County, Oklahoma, about 40%. |
| USI—M-727 | 20,000 | ...do | 235 | 0.923 | Loco Hills, New Mexico, about 10%. |
| USI—M-714 | 20,000 | ...do | 217 | 0.912 | Lindsay, Oklahoma, less than 10%. |
| USI—M-727 | 20,000 | ...do | 235 | 0.923 | Panhandle Field, Ochiltree, Texas, about 20%. |

EXAMPLE VI

A paraffin inhibitor containing equal parts of naphthalene, microcrystalline wax, heavy reduced crude, and polyethylene results in a solid inhibitor which can be dissolved or dispersed in a hydrocarbon solvent to produce a liquid inhibitor. Photomicrographs of the precipitate produced as in example IV from crude oil after addition of in excess of 50 p.p.m. of the inhibitor to the crude oil show a decrease in the crystal size of paraffin deposited.

EXAMPLE VII

The inhibitor of example VI is effective in preventing paraffin deposition in producing oil wells when added at the rate of 1 pound of solid for every 50 to 100 barrels of oil produced.

essentially of napthalene; polyethylene having a molecular weight in excess of 6,000, and a structure having at least 10 weight percent of branched carbon atoms in the polymer chain; a microcrystalline wax having a melting point in excess of about 160° F., and asphaltenes; each of such naphthalene, polyethylene, microcrystalline wax, and asphaltenes being present in the range of from 5 to 85 percent by weight.

6. The paraffin inhibitor of claim 5 wherein said molecular weight is in excess of about 20,000 and said branching is in excess of about 25 percent.

7. The paraffin inhibitor of claim 5, wherein said molecular weight is in excess of about 20,000, and said branching is in the range of about 40 to 50 percent.

8. The paraffin inhibitor of claim 5 wherein the napthalene polyethylene, microcrystalline wax and asphaltenes are present in approximately equal amounts.

* * * * *